Nov. 15, 1927.  
L. E. DANIEL  
1,649,450  
ONE-MAN HAY OR HEADED GRAIN PITCHER  
Filed Aug. 6, 1923 5 Sheets-Sheet 4
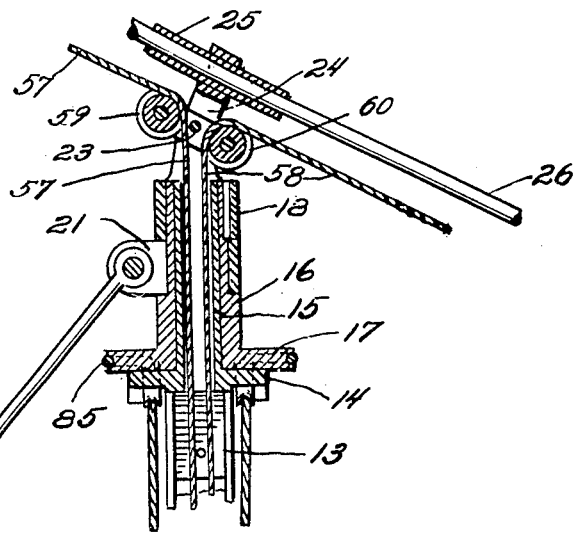
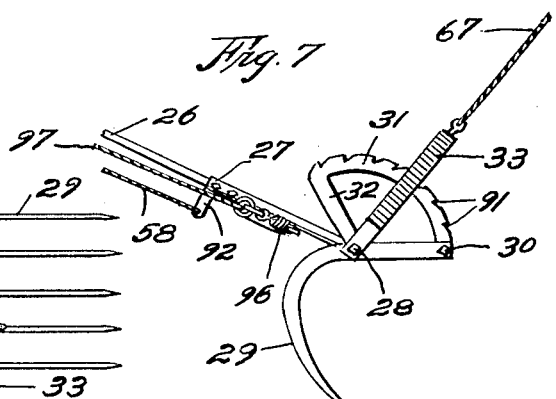
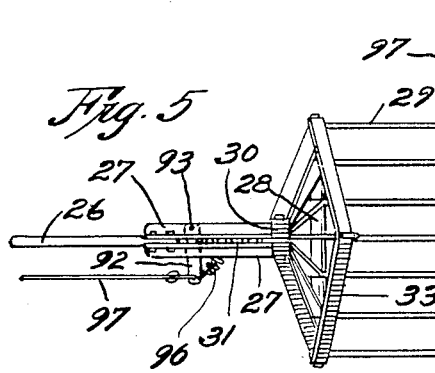
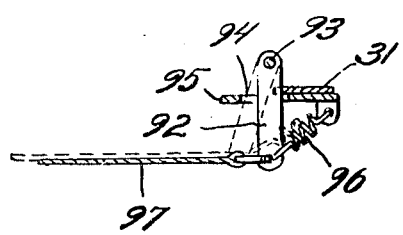

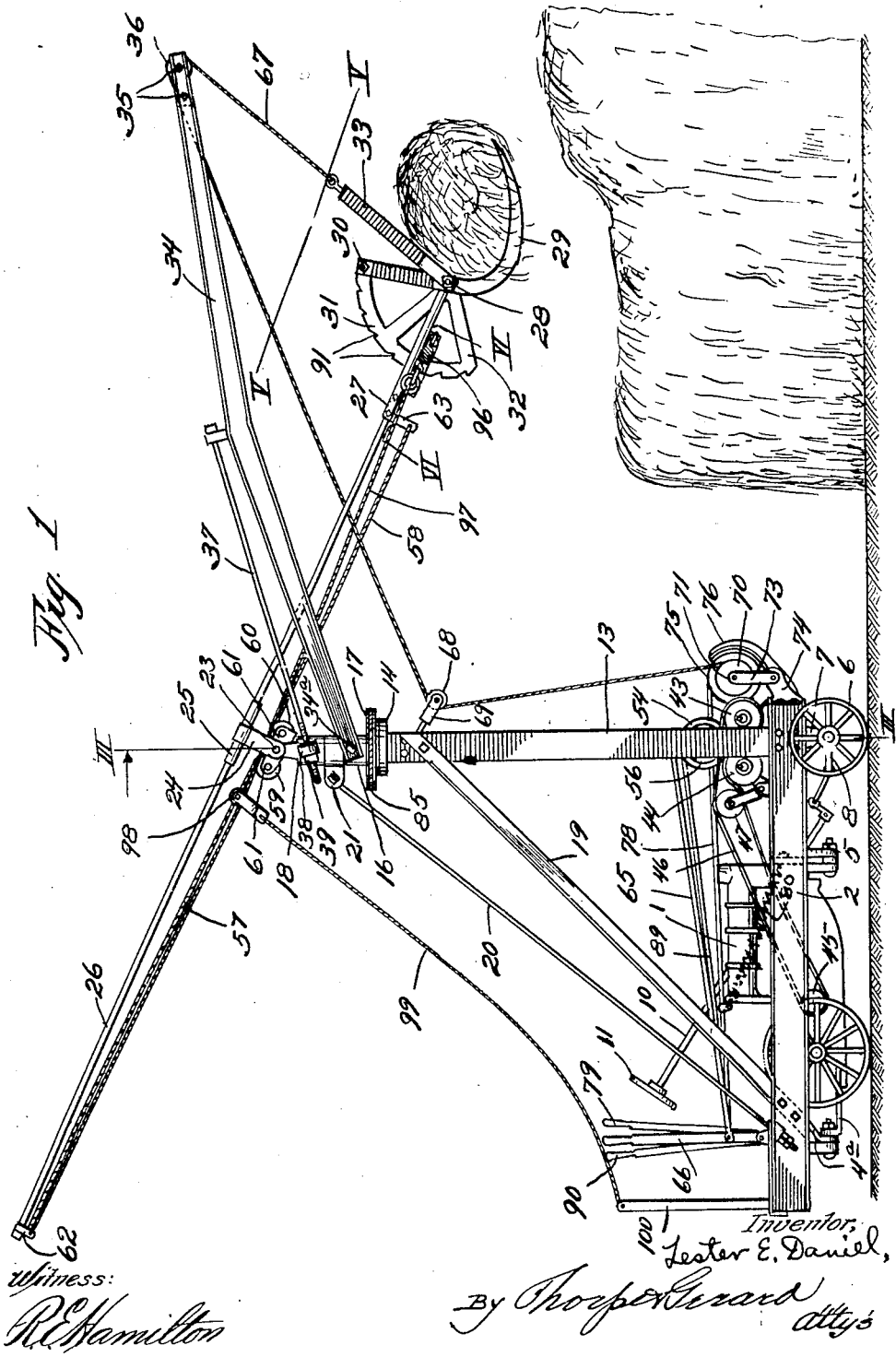

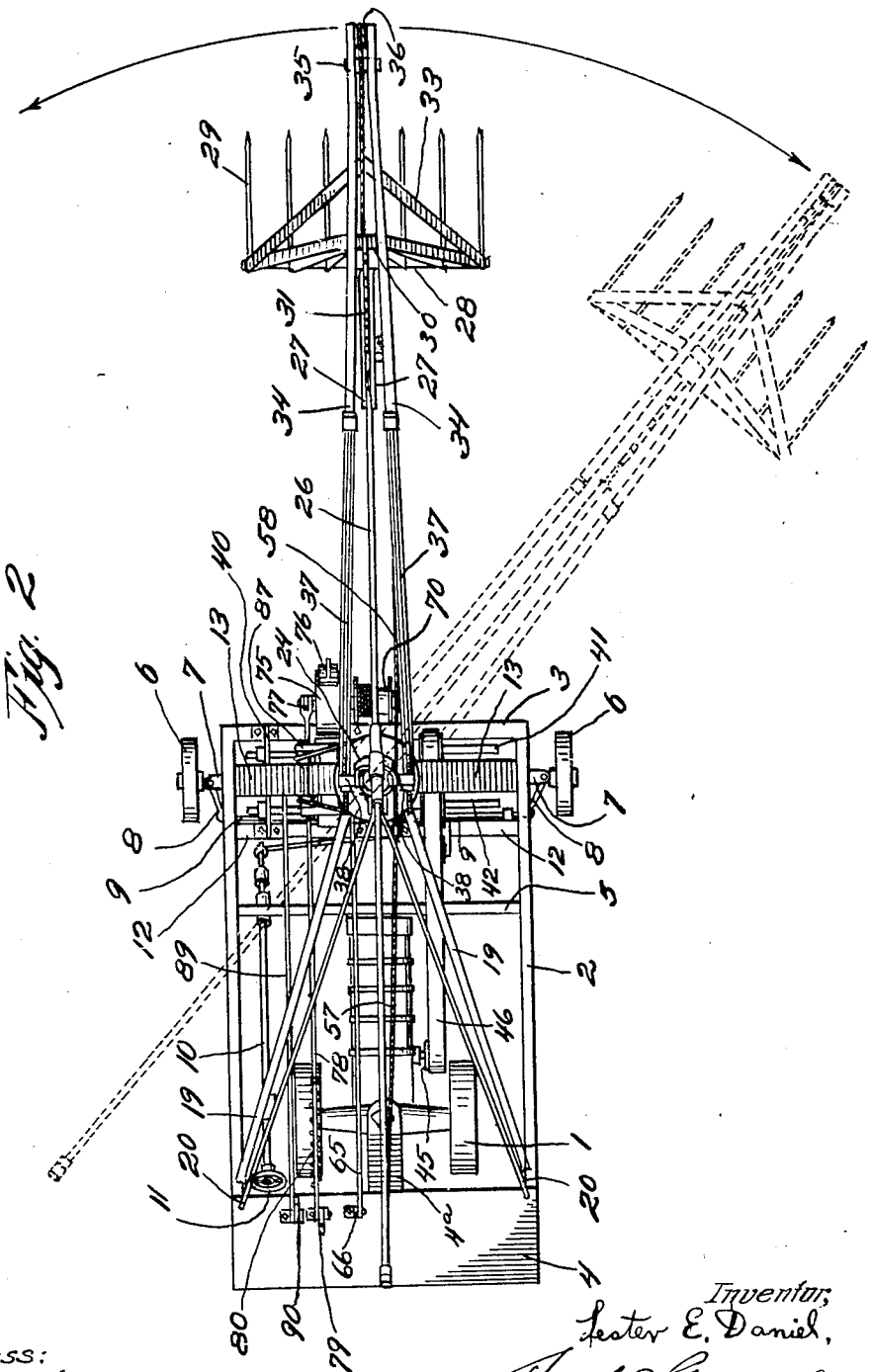

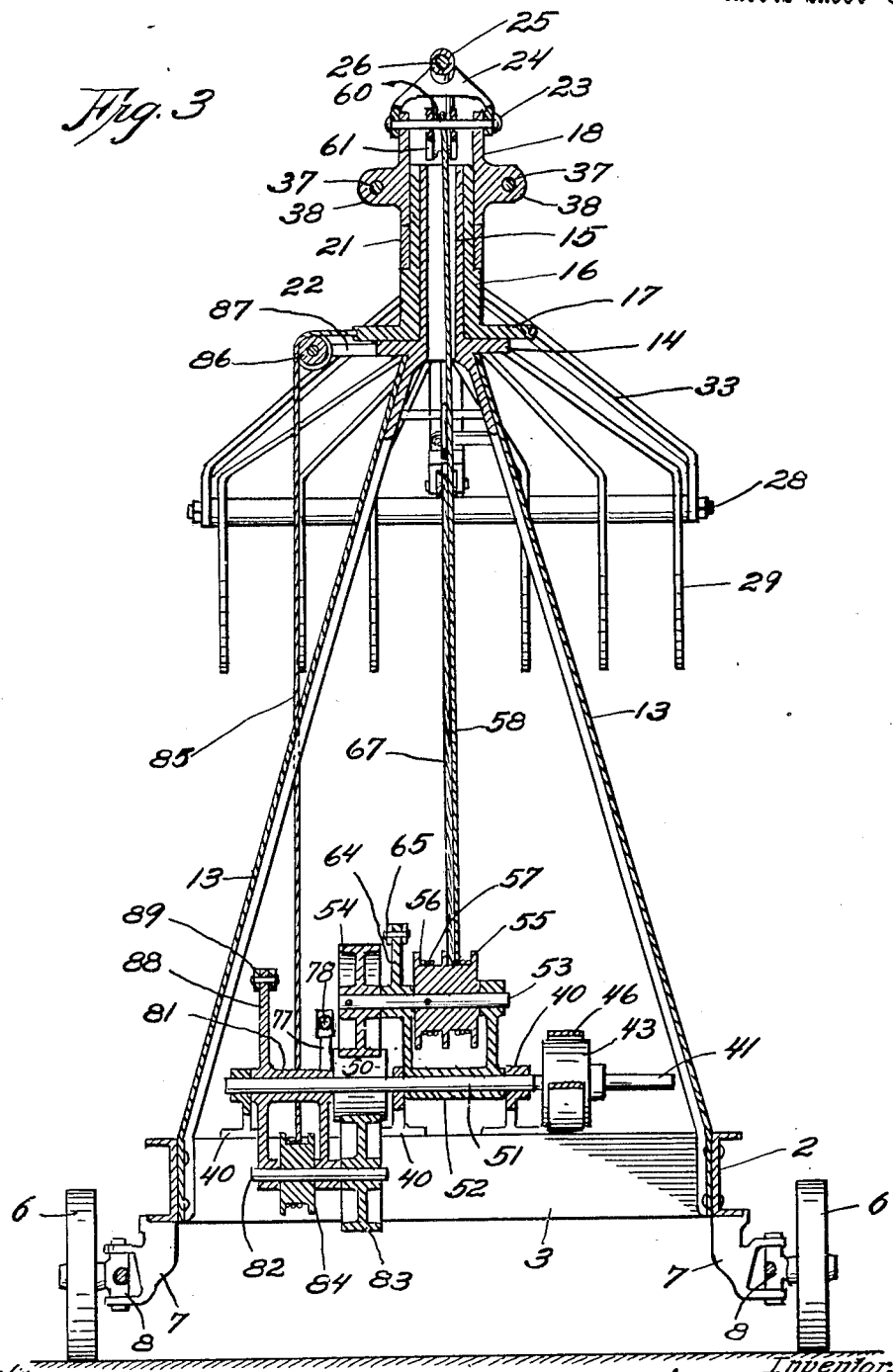

Patented Nov. 15, 1927.

1,649,450

UNITED STATES PATENT OFFICE.

LESTER E. DANIEL, OF CROFT, KANSAS.

ONE-MAN HAY OR HEADED-GRAIN PITCHER.

Application filed August 6, 1923. Serial No. 656,022.

This invention relates to hay or grain pitchers and my object is to produce a machine which may be used in loading wagons, building stacks, feeding a thresher, and the like, controlled by one man and thus obviate the employment of the three or four "hands" necessary at the present time in conducting similar work.

Another object is to produce a machine of the character referred to of comparatively simple, inexpensive, strong and durable construction.

With the objects named in view the invention consists in certain novel and useful features of construction and organization of parts as hereinafter described and claimed; and in order that it may be fully understood, reference is to be had to the accompanying drawings, in which:—

Figure 1 is a side elevation of a machine embodying the invention as it will appear when in use.

Figure 2 is a top plan view of the same.

Figure 3 is a section on the line III—III of Figure 1.

Figure 4 is a section similar to the upper part of Figure 3, but at right angles thereto.

Figure 5 is a section on the line V—V of Figure 1.

Figure 6 is a section on the line VI—VI of Figure 1.

Figure 7 is a side elevation of the fork forming a part of the invention as it will appear when tripped.

Figure 8:
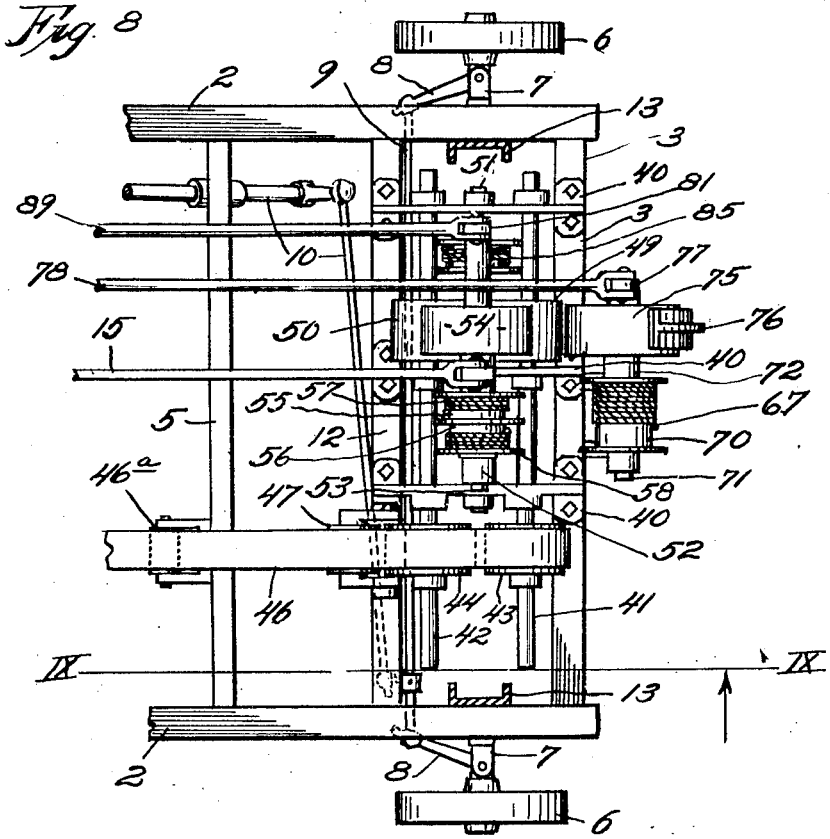
Figure 8 is an enlarged top plan view of the controlling and driving mechanism for the operative parts of the machine.

In the said drawings, where like reference characters identify corresponding parts in all of the figures, 1 represents any common or well known type of gasoline tractor or the like on which is mounted a rectangular frame comprising side members 2, front and rear members 3 and 4, the latter serving as a platform for the operator. The rear end of the frame is supported by a pair of brace members 4ª secured to the tractor. The steering and front supporting wheels of the tractor are removed, and in order to support said front end of the tractor, it is rigidly secured to a cross-piece 5 carried by the side frames 2. The front end of the frame is provided with suitable supporting and steering wheels 6 which are journaled on stub shafts pivoted to the ends of brackets 7 carried by the frame. Each of the wheels 6 is provided with a steering knuckle 8 connected to a connecting rod 9 which in turn is controlled with the ordinary type of steering shaft and connections 10. The shaft 10 is provided at its extremity in close proximity to the operator with a steering wheel 11 for the steering of the machine as will be readily understood.

A second cross-piece 12 is located at a point substantially midway between the cross-piece 5 and the front frame member 3, and rigidly secured to the side frame members 2 between cross-piece 12 and the end 3, are a pair of inwardly and upwardly converging mast members 13 which jointly carry a flange member 14 provided with a vertical tubular post 15.

Journaled on the post 15 is a sleeve member 16 formed at its lower end with a relatively large grooved pulley 17 which bears against and has rotatable engagement with the flange 14 of the mast and rigidly keyed to the upper end of the sleeve 16 is a tubular cap piece 18.

The mast is securely held against movement by a pair of braces 19 secured at their opposite ends to the rear end of the frame, and in order to brace the rotatable sleeve 16, a pair of brace rods 20 are secured at their lower ends to the rear end of the machine and at their other ends to a clamp collar 21 encircling the sleeve 16 and just below the cap-piece 18, as illustrated. The sleeve 16 is provided with a suitable shoulder 22 for the reception of the collar 21, it being understood, of course, that the sleeve is free for unrestricted rotation within the collar.

The upper end of the cap 18 is bridged by a pin 23 on which are pivoted the legs of an inverted Y-shaped sliding boom support 24, formed at its upper end with a bearing sleeve 25, through which slidingly extends a longitudinally movable boom 26. Secured to opposite sides of the front end of the boom 26 and extending forward therefrom are a pair of angle-iron extensions 27 in the ends of which is journaled a cross shaft 28 forming the pivotal point for a swinging fork 29. The fork 29 is curved, as illustrated, the tines extending parallel to each other and being secured to the shaft 28. From the points of securement to the shaft 28 of the tines, arms extend upwardly and converge inwardly and are clamped tightly together as at 30 to the opposite sides of one end of a sector 31 which normally extends between the extensions 27 and has its opposite end secured by means of a brace 32 to the shaft 28 as illustrated. Secured to the opposite ends of the shaft 28 is a fork bail 33.

The elevating mechanism for the fork and consequently the end of the sliding boom, comprises a pair of relatively fixed booms 34 pivotally secured to and at opposite sides of the rotatable sleeve 16 and just above the grooved wheel 17 thereof as at 34ᵃ, said booms converging forwardly and being secured together at their front ends by means of a pair of bolts 35, one of them forming a journal for a pulley 36. The fixed booms 34 are subject to slight adjustments for height through the provision of a pair of brace members 37 secured to and at opposite sides of the cap-piece 18 and just above the collar 21, said members being threaded at their ends and extending through a pair of ears 38 formed on the cap-piece and having clamp nuts 39 at their ends. By drawing up on the nuts 39 it will be evident that the boom will pivot around the points 34ᵃ, the free ends of the booms thus being elevated or lowered.

Figure 9:
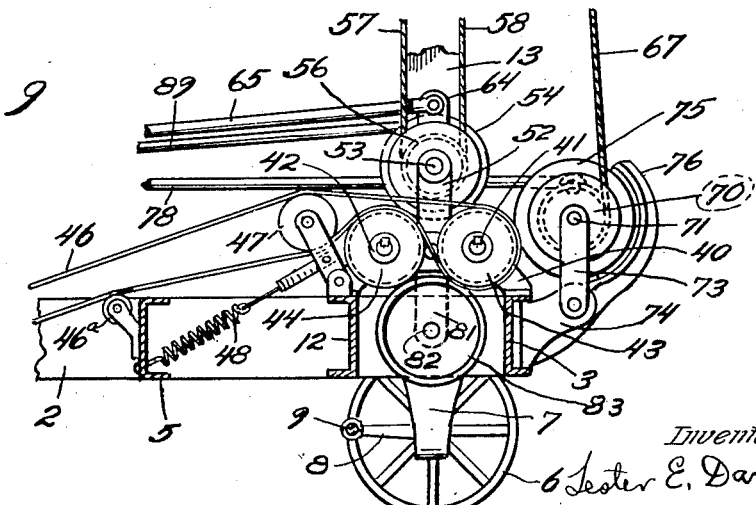
Figure 9 is a section on the line IX—IX of Figure 8.

The operating parts for the device as described, comprises a series of longitudinal bridge members 40 supported by the cross piece 12 and front end 3 of the machine, said bridge members being provided with suitable journals for a pair of parallel drive shafts 41 and 42 on which are keyed drive wheels 43 and 44 respectively. The engine of the tractor is supplied with suitable clutch mechanism (not shown) whereby power may be shifted from the drive wheels of the tractor to an auxiliary pulley 45. Encircling the pulleys 43 and 45 is a drive belt 46, the outside face of said belt being in contact with the pulley 44, thus driving the pulleys 43 and 44 in opposite directions, suitable friction being imposed on the belt by means of a spring-actuated idler 47 pivoted to the cross-piece 12 and actuated by a spring 48 (see Figure 9). A second idler 46ᵃ is secured to cross piece 5 to prevent accidental contact of the belt with the cross-piece 5.

Secured to the shafts 41 and 42 is a pair of opposite friction transmission wheels 49 and 50 respectively. Secured in the bridge members 40 and centrally of the shafts 41 and 42 is an auxiliary shaft 51, on which is journaled an upwardly projecting bifurcated bracket 52, bearing at its upper end a shaft 53 provided with a friction drive wheel 54 and a pair of winding drums 55 and 56 on which is oppositely wound the ends of a pair of cables 57 and 58 respectively.

The cables 57 and 58 extend upwardly through the tubular post 15 and pass over a pair of sheaves 59 and 60 respectively which are carried by a pair of ears 61 formed on the sliding boom support 24. The extremity of the cable 57 is secured to a downwardly projecting lug 62 attached to the rear end of the sliding boom, while the end of the cable 58 is attached to a similar lug 63 secured near the front end of said boom.

Integrally formed with the rocking bracket 52 is an arm 64 to which is pivotally secured one end of an operating rod 65 extending rearwardly of the machine and attached to an operating lever 66 in convenient position for operation by the driver of the machine. Through operation of the lever 66, it will be evident that the driver may rock the bracket 52 forwardly or rearwardly to place the friction wheel 54 in contact with either of wheels 49 and 50 and consequently rotate the shaft 51 in either of two directions, thus winding the cable 57 or 58 on its respective drum and consequently projecting or retracting the fork with respect to the machine, as found desirable. It will be evident, in this connection that winding of one cable will automatically unwind the other cable, and that when force tending to manipulate the handle 66 is removed the standard will automatically centralize itself between the two extremes as the pull on both cables is equal.

For the elevation of the fork, a cable 67 is attached to the bail 33 thereof and extends upwardly and over the sheave 36 carried by the end of the fixed boom and then downwardly over the sheave 68 carried by a hanger 69 secured to the mast at just below the flange 14, and then downwardly and around a winding drum 70 keyed on a shaft 71 journaled in a bearing 72 carried by a pair of arms 73 pivoted at their lower ends to a pair of ears 74 projecting forwardly from the frame member 3.

Keyed on the shaft 71 is a friction drive wheel 75 adapted for operation by the friction wheel 49 to wind the cable 67 on the drum 70 and elevate the fork, and in order to prevent too rapid unwinding movement of the drum and consequent lowering of the fork, the friction wheel 75 when rocked forwardly is adapted to come into frictional engagement with a fixed brake 76 carried by the frame member 3. The operating mechanism for rocking the bearing 72 comprises an upwardly projecting arm 77 on the bearing to which is pivotally secured one end of an operating rod 78 extending rearwardly and operated by a lever 79 in convenient position for actuation by the driver. Secured at one end to the operating rod 78 is a retractile spring 80 having its opposite end secured to the cross-piece 5. It will be evident that under normal conditions the spring 80 will maintain the bearing 72 rocked forwardly and consequently the friction wheel 75 in contact with the brake 76. When it is desired to elevate the fork the operator pulls rearwardly on the lever 79 and rocks the bearing and places the wheel 75 in contact with the wheel 49. Upon release of the lever by the operator the spring 80 rocks the bearing in the opposite direction and applies the wheel 75 in contact with the brake 76 and thus impedes undue downward movement of the fork through the alternate application and release of pressure, it being understood that the spring 80 is capable of applying sufficient pressure on the wheel 75 against the brake 76 to stop all downward movement, even when the fork is carrying a load.

In order to swing the fork and its supporting booms to the right or left as desired, a bracket 81 is rockingly mounted on the shaft 51 and stands vertically normally. Journaled in the lower end of the bracket is a shaft 82 on which is keyed a friction wheel 83 adapted for frictional engagement with either of the friction drive wheels 49 or 50. Keyed on said shaft 82 is a winding drum 84 encircled by a few turns of an endless cable 85 which extends upwardly on opposite sides of one of the mast members 13 and over a pair of sheaves 86 carried by a pair of outwardly projecting arms 87 secured rigidly to the flange 14 of the masts, and then around the grooved wheel 17 of the rotatable sleeve 16. The bracket 81 is formed with an upwardly projecting arm 88 to which is pivotally secured one end of an operating rod 89 which is secured at its opposite end to an operating lever 90 in convenient position for actuation by the driver of the machine. It will be evident that the driver may rock the bracket to transmit power from either of drive wheels 49 or 50 to actuate the winding drum and cause the endless cable 85 through its contact with the grooved wheel 17 to swing the booms and consequently the fork either to the right or left as found desirable.

The sector 31 of the fork is formed with a series of ratchet teeth 91 one of which is normally engaged with a latch 92 pivoted as at 93 to one of the main boom extensions 27 and working in a slot 94 formed in a plate 95 secured to said extensions. The latch 92 is actuated by a spring 96 to maintain it constantly in position for engagement with the sector.

In order to trip the fork and allow it to swing to the position shown in Figure 7 for the dumping of a load, a cable 97 is secured at one end to the free end of the latch 92 and at its opposite end to the lug 62 of the riding boom. Freely sliding on the cable 97 is a sheave 98 which is secured to one end of an operating line 99 extending downwardly and rearwardly and attached to a post 100 so that the line may be held in convenient position for operation by the driver. It will be evident that the driver by pulling on the line 99 may readily trip the catch and allow the fork to swing downwardly. The fork is reset to the desired position by allowing it to drag more or less on the stack or the like during the retraction of the sliding boom, the ratchet teeth 91 permitting the latch to be repressed on the passage of each tooth as common in the art, until the fork has attained the desired position. In this connection it is desirable to point out that the free sheave arrangement 98 is provided in order that the tripping of the fork may be readily carried out regardless of the position of extension or retraction of the fork.

In the operation of the machine, the fork will be lowered so as to scoop under the load to be lifted and then by the simultaneous application of power to the winding drums 55 and 70, through levers 66 and 79, the cables 57 and 67 impart forward and upward movement to the fork thus forcing the load on the fork and elevating such load at the same time. After the load has been elevated to the proper height, the operator releases lever 79, the spring 80 immediately applying the brake and holding the load at the desired elevation. The load may now be thrust further forward if desired, and swung from the right to left or vice versa by rotating the drum 84 through the instrumentality of the lever 90, until immediately above the point where it is desired to deposit the load. The operator now trips the catch 92 by means of the line 99 to permit the fork to dump the load as hereinabove described. The drum 56 is now operated to cause the retraction of the fork, the operator simultaneously freeing the drum 70 to permit the fork to swing downwardly and drag slightly so that the fork may be reset as mentioned in connection with the description of the operation hereinabove set out.

It will be evident from a consideration of the drawings and detailed description and the short recapitulation of operation that the movements of the fork may be readily controlled as found desirable in different classes of work, and it is to be understood that while I have described and claimed the preferred embodiment of the invention, I reserve the right to make all changes properly falling within the spirit and scope of the appended claims.

I claim:

1. In a machine of the character described, a fixed mast, a rotary mast carried by the upper end of said fixed mast, a fixed boom projecting from said rotary mast, a second boom having sliding and oscillating engagement with the upper end of the rotary mast, a fork carried by one end of said movable boom, and a connection between said fork and fixed boom for elevating the former.

2. In a machine of the character described, a fixed mast, a flange adjacent the upper end of said mast, a rotating mast supported by said flange, a yoke pivotally mounted on the upper end of said rotating mast, a bearing sleeve supported by said yoke, a boom slidingly mounted in the yoke, a fork carried by one end of said boom, and means for elevating said fork.

3. In a machine of the character described, a fixed mast terminating at its upper end in a tubular extension, a rotary mast receiving and journaled on said extension, a fixed boom projecting from said rotary mast, a second boom having sliding and oscillating engagement with the upper end of said rotary mast, a fork carried by one end of said movable boom, and a connection between said fork and fixed boom for elevating the former.

In witness whereof I hereunto affix my signature.

LESTER E. DANIEL.